US009593256B2

(12) United States Patent
Schrinner et al.

(10) Patent No.: US 9,593,256 B2
(45) Date of Patent: Mar. 14, 2017

(54) LOW-SOLVENT POLYACRYLATE COPOLYMER DISPERSIONS

(71) Applicant: Bayer Intellectual Property GmbH, Monheim (DE)

(72) Inventors: Marc Claudius Schrinner, Shanghai (CN); Heinz-Dietmar Gewiss, Meerbusch (DE); Nusret Yuva, Burscheid (DE); Martin Melchiors, Leichlingen (DE)

(73) Assignee: Covestro Deutschland AG, Leverkusen (DE)

( * ) Notice: Subject to any disclaimer, the term of this patent is extended or adjusted under 35 U.S.C. 154(b) by 59 days.

(21) Appl. No.: 14/365,195

(22) PCT Filed: Dec. 17, 2012

(86) PCT No.: PCT/EP2012/075836
§ 371 (c)(1),
(2) Date: Jun. 13, 2014

(87) PCT Pub. No.: WO2013/092513
PCT Pub. Date: Jun. 27, 2013

(65) Prior Publication Data
US 2014/0316050 A1  Oct. 23, 2014

(30) Foreign Application Priority Data

Dec. 22, 2011 (EP) .................................... 11195158

(51) Int. Cl.
| | | |
|---|---|---|
| *C09D 133/10* | (2006.01) | |
| *C08F 220/18* | (2006.01) | |
| *C08F 265/06* | (2006.01) | |
| *C08F 8/44* | (2006.01) | |
| *C09D 151/00* | (2006.01) | |
| *C08G 18/62* | (2006.01) | |
| *C08G 18/79* | (2006.01) | |
| *C08G 18/08* | (2006.01) | |
| *C09D 175/04* | (2006.01) | |
| *C08F 285/00* | (2006.01) | |
| *C08F 2/20* | (2006.01) | |
| *C09D 133/06* | (2006.01) | |

(52) U.S. Cl.
CPC .............. *C09D 133/10* (2013.01); *C08F 2/20* (2013.01); *C08F 8/44* (2013.01); *C08F 220/18* (2013.01); *C08F 265/06* (2013.01); *C08F 285/00* (2013.01); *C08G 18/0866* (2013.01); *C08G 18/6225* (2013.01); *C08G 18/792* (2013.01); *C09D 133/066* (2013.01); *C09D 151/00* (2013.01); *C09D 175/04* (2013.01); *C08F 2800/20* (2013.01); *C08F 2810/50* (2013.01)

(58) Field of Classification Search
CPC ........ C08F 220/18; C08F 2/20; C08F 218/04; C08F 216/02; C08F 220/06; C08F 220/20; C08F 212/08; C08F 220/02; C08F 218/10; C08F 2800/20; C09D 133/10; C09D 133/066; C09D 151/00; C09D 175/04
See application file for complete search history.

(56) References Cited

U.S. PATENT DOCUMENTS

| | | | |
|---|---|---|---|
| 5,252,696 A | 10/1993 | Laas et al. | |
| 5,876,802 A * | 3/1999 | Brunnemann | ..... C08G 18/6254 427/409 |
| 6,399,691 B1 | 6/2002 | Melchiors et al. | |
| 6,426,414 B1 | 7/2002 | Laas et al. | |
| 2001/0056154 A1 | 12/2001 | Blum et al. | |
| 2002/0151638 A1 | 10/2002 | Melchiors et al. | |
| 2004/0034162 A1 | 2/2004 | Laas et al. | |
| 2004/0034164 A1 | 2/2004 | Melchiors et al. | |
| 2004/0063846 A1* | 4/2004 | Lettmann | ............. C09D 175/04 524/523 |
| 2005/0165145 A1 | 7/2005 | Melchiors et al. | |
| 2007/0282049 A1 | 12/2007 | Munzmay et al. | |

FOREIGN PATENT DOCUMENTS

| | | |
|---|---|---|
| DE | 10007821 A1 | 8/2001 |
| DE | 10024624 A1 | 11/2001 |
| DE | 10106574 A1 | 8/2002 |
| EP | 0540985 A1 | 5/1993 |
| EP | 0947557 A2 | 10/1999 |
| EP | 0959087 A1 | 11/1999 |
| EP | 1024184 A1 | 8/2000 |

OTHER PUBLICATIONS

International Search Report for PCT/EP2012/075836 mailed Mar. 20, 2013.

* cited by examiner

*Primary Examiner* — Karuna P Reddy
(74) *Attorney, Agent, or Firm* — Drinker Biddle & Reath LLP

(57) ABSTRACT

The present invention relates to an aqueous secondary copolymer dispersion comprising a copolymer (P) synthesized from a mixture of free-radically polymerizable monomers (M) comprising (M1) cycloaliphatic esters of acrylic and/or methylacrylic acid; (M2) vinyl esters of aliphatic carboxylic acids; (M3) hydroxy-functional, free-radically polymerizable monomers; (M4) carboxyl-functional, free-radically polymerizable monomers and (M5) hydroxyl- and carboxyl-free (meth)acrylic esters having C1 to C12 hydrocarbon radicals in the alcohol moiety and/or vinylaromatics. The mixture further comprises glycidyl esters of aliphatic carboxylic acids. The invention also relates to a method for the production of such a dispersion, to the use of the dispersion as a coating and as a binder in 2K polyurethane coatings.

6 Claims, No Drawings

LOW-SOLVENT POLYACRYLATE COPOLYMER DISPERSIONS

CROSS-REFERENCE TO RELATED APPLICATIONS

This application is a national stage application (under 35 U.S.C. §371) of PCT/EP2012/075836, filed Dec. 17, 2012, which claims benefit of European Application No. 11195158.8, filed Dec. 22, 2011, both of which are incorporated herein by reference in their entirety.

The present invention relates to an aqueous secondary copolymer dispersion comprising a copolymer (P) synthesized from a mixture of free-radically polymerizable monomers (M) comprising (M1) cycloaliphatic esters of acrylic and/or methylacrylic acid; (M2) vinyl esters of aliphatic carboxylic acids; (M3) hydroxy-functional, free-radically polymerizable monomers; (M4) carboxyl-functional, free-radically polymerizable monomers and (M5) hydroxyl- and carboxyl-free (meth)acrylic esters having C1 to C12 hydrocarbon radicals in the alcohol moiety and/or vinylaromatics. The invention also relates to a method for the production of such a dispersion, to the use of the dispersion as a coating and as a binder in 2K polyurethane coatings.

Aqueous secondary copolymer dispersions enjoy widespread use in the art as coating materials and as binders. In this respect, the term "secondary dispersions" refers to those aqueous dispersions which to start with are polymerized in a homogenous organic medium and thereafter are redispersed in an aqueous medium with neutralization, generally without the addition of external emulsifiers.

For example, US 2007/282049 A1 relates to new, aqueous secondary copolymer dispersions, to a process for preparing them and to their use for producing high-grade coatings, especially for wood. The dispersions comprise a copolymer (P) synthesized from a mixture of free-radically polymerizable monomers (M) comprising (M1) cycloaliphatic esters of acrylic and/or methylacrylic acid and also (M2) vinyl esters of aliphatic carboxylic acids.

U.S. Pat. No. 6,399,691 describes a hydroxy-functional copolymer P, which is present as a dispersion and/or solution in water, and is obtained by successively carrying out process steps A-D:A) initially introducing a hydrophobic polymer containing hydroxyl groups into a reaction vessel, B) introducing an initiator component into that vessel, C) subsequently polymerizing a hydrophobic monomer mixture containing hydroxyl groups in that vessel and D) subsequently polymerizing a hydrophilic monomer mixture containing hydroxyl and acid groups in that vessel. The present invention also relates to a process for the preparation of copolymers P following the procedure previously set forth and to coating compositions containing these copolymers P and one or more crosslinking agents.

US 2005/165145 A1 is concerned with a process for preparing copolymer dispersions that includes subjecting A) one or more vinyl monomer mixtures containing a) OH-free (meth)acrylic esters and/or vinylaromatics, b) hydroxy-functional vinyl monomers and/or hydroxy-functional (meth)acrylic esters, c) ionic and/or potentially ionic monomers capable of free-radical copolymerization, and d) optionally further monomers, other than the compounds of components a)-c), capable of free-radical copolymerization; to free-radical polymerization in the presence of e) compounds according to formula (I) where R1 is an aliphatic, araliphatic or aromatic radical having 1 to 18 carbon atoms, R2 is H or $CH_3$, R3, R4 are identical or different aliphatic radicals having 1 to 7 carbon atoms and n is 1 to 4; and subsequently dispersing the resultant copolymer B) before or after addition of a neutralizing agent C) in water. The resulting dispersions can be used to coat substrates.

US 2004/034164 A1 relates to an aqueous binder dispersion that includes at least one copolymer (P) containing carboxylic acid and/or carboxylate groups. The copolymer (P) includes structural units of carboxyl-free (meth)acrylic esters with a cycloaliphatic structure, and at least 25 mol % of the carboxylic acid groups of the copolymer (P) in the dispersion being present in triethanolamine-neutralized form. The aqueous binder can be used in aqueous coating materials, which can be used to coat a substrate.

Due to environmental, health and safety concerns it would be desirable to have copolymer dispersions for coating purposes with an organic (co)solvent as low as possible while at the same time not compromising the properties of the coating. The present invention has the object of providing such low-solvent dispersions.

According to the invention this object is achieved by an aqueous secondary copolymer dispersion comprising a copolymer (P) synthesized from a mixture of free-radically polymerizable monomers (M) comprising:

(M1) cycloaliphatic esters of acrylic and/or methylacrylic acid
(M2) vinyl esters of aliphatic carboxylic acids
(M3) hydroxy-functional, free-radically polymerizable monomers
(M4) carboxyl-functional, free-radically polymerizable monomers
(M5) hydroxyl- and carboxyl-free (meth)acrylic esters having C1 to C12 hydrocarbon radicals in the alcohol moiety and/or vinylaromatics,
wherein the mixture further comprises glycidyl esters of aliphatic carboxylic acids.

The dispersions according to the invention lead to coatings with a high gloss and a high hardness when compared to dispersions with a high (ca. 8 weight-%) of (co)solvent. Without wishing to be bound by theory it is believed that the glycidyl esters act at least as a reactive diluent.

For the purposes of the present invention, acrylic acid or methacrylic acid are also defined as (meth)acrylic acid.

Suitable monomers (M1) are, for example, cyclohexyl (meth)acrylate, cyclohexyl (meth)acrylates ring-substituted with alkyl groups, 4-tert-butylcyclohexyl (meth)acrylate, norbornyl (meth)acrylate, isobornyl (meth)acrylate, preference being given to isobornyl acrylate and/or isobornyl methacrylate, and particular preference to isobornyl methacrylate. It is also possible to use mixtures comprising isobornyl acrylate and isobornyl methacrylate and other monomers (M1). The monomers (M1) other than isobornyl acrylate and isobornyl methacrylate may optionally be used in amounts of less than 10% by weight, based on the sum of (M1) to (M5).

Suitable monomers (M2) are the esterification products of vinyl alcohol with linear or branched, aliphatic carboxylic acids such as, for example, vinyl acetate, vinyl propionate, vinyl butyrate, vinyl 2-ethylhexanoate, vinyl octanoate, vinyl decanoate, vinyl dodecanoate (vinyl laurate) or vinyl stearate.

Suitable hydroxyl-functional monomers (M3) include ethylenically unsaturated, hydroxyl-containing monomers, such as hydroxyalkyl esters of unsaturated carboxylic acids, preferably hydroxyalkyl (meth)acrylates having 2 to 12, preferably 2 to 6, carbon atoms in the hydroxyalkyl radical. Examples of particularly preferred compounds are 2-hydroxyethyl (meth)acrylate, the isomeric hydroxypropyl (meth)acrylates, 2-, 3- and 4-hydroxybutyl (meth)acrylates, and the isomeric hydroxyhexyl (meth)acrylates.

Suitable carboxyl-functional free-radically polymerizable monomers (M4) are olefinically unsaturated monomers containing carboxylic acid or carboxylic anhydride groups, such as acrylic acid, methacrylic acid, beta-carboxyethyl acrylate, crotonic acid, fumaric acid, maleic anhydride, itaconic acid or monoalkyl esters of dibasic acids or anhydrides, such as maleic acid monoalkyl esters, for example. Acrylic acid and/or methacrylic acid are preferred.

Hydroxyl- and carboxyl-free monomers (M5) employed are acrylates and methacrylates having 1 to 12 carbon atoms in the alcohol moiety of the ester group. The alcohol moiety is preferably aliphatic and may be linear or branched.

Examples of suitable monomers of component (M5) are methyl, ethyl, n-propyl, isopropyl, n-butyl, isobutyl, tert.-butyl, the isomeric pentyl, hexyl, 2-ethylhexyl, octyl and dodecyl (meth)acrylates. Particularly suitable vinylaromatics are styrene, optionally substituted styrenes and vinyltoluenes. Preferred monomers (M5) are methyl, n-butyl, isobutyl, tert-butyl (meth)acrylate and also 2-ethylhexyl acrylate and styrene.

Optionally, monomers (M6) such as acetoacetoxyethyl methacrylate, acrylamide, acrylonitrile, vinyl ethers, methacrylonitrile or vinyl acetates may also be present. In addition it is possible to make use, proportionally, of monofunctional polyalkylene oxides having molecular weights of 200 to 3000 g/mol, preferably 350 to 1000 g/mol, or esterified (meth)acrylic acid, which are suitable as nonionic, hydrophilic groups. Suitable alkylene oxides include, preferably, ethylene oxide or mixtures of ethylene oxide and propylene oxide. Preferably, however, the hydrophilicization of the copolymers takes place by ionic groups means monomers (M4).

The proportions of the synthesis components (M1) to (M6) may be chosen such that the copolymer (P) has an OH number of 35 to 200 mg KOH/g, preferably of 50 to 125 mg KOH/g solids and an acid number of 10 to 50 mg KOH/g, preferably 15 to 30 mg KOH/g solids. The acid number is determined as specified in DIN 53402. The OH number is determined as specified in DIN 53240.

The preparation of the copolymer (P) can in principle be carried out by means of conventional free-radical polymerization processes in organic phase. The copolymer (P) is preferably prepared in a multi-stage operation of the kind already described in EP-A 0 947 557 (p. 31.2-p. 41.15) or in EP-A 1 024 184 (P. 21.53-p. 41.9). In this operation first a hydrophobic monomer mixture (M1), free from acid groups or with a low acid group content, is metered in, and then, at a later point in time in the polymerization, a more hydrophilic monomer mixture (MII), containing acid groups, is metered in, the more hydrophilic monomer mixture (MII) containing acid groups containing no monomers of type (M1) and (M2).

The copolymerization is carried out in general at 40 to 180° C., preferably at 80 to 160° C. Suitable initiators (I) for the polymerization reaction include organic peroxides such as di-tert-butyl peroxide, for example, or tert-butyl peroxy-2-ethylhexanoate and azo compounds. The initiator quantities employed depend on the desired molecular weight. For reasons of operational reliability and of greater ease of handling it is also possible to use peroxide initiators in the form of a solution in suitable organic solvents of the type already specified.

The rate of addition of the initiator (I) in the process of the invention may be controlled such that it lasts until the end of the monomer feed (M), and the solvent quantities in steps one and two are chosen so as to result in an organic solvent content of less than 5% by weight.

The amounts of the ingredients are preferably calculated so as to result in a mass ratio (V):(M) of 1:9 to 3:7 and (M1):(MII) of 9:1 to 6:4, with particular preference a mass ratio (V):(M) of 1.2:8.8 to 2:8 and (M1):(MII) of 8.5:11.5 to 7:3.

The free-radical polymerization can be carried out in the presence of a solvent or solvent/water mixture which is charged to the reaction vessel. Suitable organic solvents include any solvents that are known in paint technology, preference being given to those which are typically used as cosolvents in aqueous dispersions, such as alcohols, ethers, alcohols containing ether groups, esters, ketones or nonpolar hydrocarbons, for example, or mixtures of these solvents. The solvents are used in amounts such that their level in the completed dispersion is 0% to 5% by weight, preferably 0.1% to 5% by weight.

It is further possible to prepare the copolymer by the process of EP-A 1 024 184, using a hydrophobic copolymer as the initial charge.

Instead of a multi-stage polymerization process it is likewise possible to carry out the process of the invention continuously (gradient polymerization), i.e. a monomer mixture is added with a changing composition, the hydrophilic (acid-functional) monomer fractions being higher towards the end of the feed than at the beginning.

The number-average molecular weight Mn of the copolymers (P) can be controlled through a specific choice of the operating parameters, such as of the molar monomer/initiator ratio, for example, of the reaction time or of the temperature, and is situated in general at between 500 g/mol and 30 000 g/mol, preferably between 1000 g/mol and 15 000 g/mol, more preferably between 1500 g/mol and 10 000 g/mol. The hydroxyl group content of the copolymers (P) in 100% form is preferably 1% to 5% by weight, preferably 1.5% to 4.5% by weight and with particular preference 1.75% to 3.5% by weight.

Before, during or after the dispersion of the copolymers (P) in water, the acid groups present are converted at least proportionally into their salt form by addition of suitable neutralizing agents. Suitable neutralizing agents are organic amines or water-soluble inorganic bases, such as soluble metal hydroxides, metal carbonates or metal hydrogen carbonates, for example, such as sodium hydroxide or potassium hydroxide, for example.

Examples of suitable amines are butyldiethanolamine, N-methylmorpholine, triethylamine, ethyldiisopropylamine, N,N-dimethylethanolamine, N,N-dimethyl-isopropanolamine, N-methyldiethanolamine, diethylethanolamine, triethanolamine, butanolamine, morpholine, 2-aminomethyl-2-methylpropanol or isophoronediamine. In mixtures it is also possible, proportionally, to use ammonia. Particularly preferred are triethanolamine, N,N-dimethylethanolamine and ethyldiisopropylamine.

The neutralizing agents are added in amounts such that in total the theoretical degree of neutralization [of the acid groups] is from 40% to 150%, preferably 60% to 120%. The degree of neutralization here is the ratio of added basic groups of the neutralizing component to acid functions of the copolymer. The pH of the aqueous copolymer dispersion of the invention is generally 6 to 10, preferably 6.5 to 9.

The invention will be further described with reference to certain embodiments and other aspects. They may be combined freely unless the context clearly indicates otherwise. If several monomers of the same denomination (for example (M1)) are used within one embodiment, this does not mean that these monomers need to be the same. Furthermore, the use of the plural in connection with the monomers when describing the present invention does not imply that there needs to be more than one type of monomer under one denomination present.

In one embodiment of the dispersion according to the invention the content of solids in the dispersion is in a range of ≥10 weight-% to ≤90 weight-% (preferably ≥40 weight-% to ≤60 weight-%), based on the total weight of the dispersion and organic solvents are present in an amount of ≤5 weight-% (preferably ≤4 weight-%, more preferred ≤2 weight-%), based on the total weight of the dispersion. The solids contents are determined as specified in DIN-EN ISO 3251. Organic solvents to be reduced or avoided include acetone and other solvents with boiling points under 100° C.

In another embodiment of the dispersion according to the invention, in the glycidyl esters of aliphatic carboxylic acids the carboxylic acids comprise 8, 9 and/or 10 carbon atoms. Preferred is the glycidyl ester of neodecanoic acid In another embodiment of the dispersion according to the invention:
(M1) is isobornyl (meth)acrylate
(M2) is represented by the formula $H_2C=CH-O-C(=O)-C(R1)(R2)(CH_3)$ in which R1 and R2 represent saturated alkyl groups with a total of 6, 7 or 8 carbon atoms
(M3) is hydroxyethyl (meth)acrylate and/or hydroxypropyl (meth)acrylate
(M4) is (meth)acrylic acid
(M5) is styrene, methyl (meth)acrylate and/or n-butyl (meth)acrylate.

In another embodiment of the dispersion according to the invention the monomers (M1) to (M5) are used in the following amounts:
(M1) ≥0.1 weight-% to ≤3 weight-% (preferably ≥0.5 weight-% to ≤1.5 weight-%)
(M2) ≥0.1 weight-% to ≤3 weight-% (preferably ≥0.5 weight-% to ≤1.5 weight-%)
(M3) ≥10 weight-% to ≤30 weight-% (preferably ≥15 weight-% to ≤25 weight-%)
(M4) ≥1 weight-% to ≤10 weight-% (preferably ≥3 weight-% to ≤8 weight-%)
(M5) ≥40 weight-% to ≤80 weight-% (preferably ≥50 weight-% to ≤65 weight-%)
and the glycidyl esters of aliphatic carboxylic acids in amounts of ≥5 weight-% to ≤20 weight-% (preferably (preferably ≥7 weight-% to ≤15 weight-%),
based on the total weight of the solids in the dispersion, the amounts given adding up to ≤100 weight-%.

In another embodiment of the dispersion according to the invention the copolymer (P) is synthesized by first synthesizing a copolymer (P1) from mixture of free-radically polymerizable monomers (M) comprising:
(M1) cycloaliphatic esters of acrylic and/or methylacrylic acid
(M2) vinyl esters of aliphatic carboxylic acids
(M3) hydroxy-functional, free-radically polymerizable monomers
(M5) hydroxyl- and carboxyl-free (meth)acrylic esters having C1 to C12 hydrocarbon radicals in the alcohol moiety and/or vinylaromatics,
followed by adding to the copolymer (P1) in one or more subsequent steps a mixture of free-radically polymerizable monomers (M) comprising:
(M3) hydroxy-functional, free-radically polymerizable monomers
(M4) carboxyl-functional, free-radically polymerizable monomers
(M5) hydroxyl- and carboxyl-free (meth)acrylic esters having C1 to C12 hydrocarbon radicals in the alcohol moiety and/or vinylaromatics
and comprising glycidyl esters of aliphatic carboxylic acids.

In another embodiment of the dispersion according to the invention:
for the synthesis of copolymer (P1):
(M1) is isobornyl (meth)acrylate
(M2) is represented by the formula $H_2C=CH-O-C(=O)-C(R1)(R2)(CH_3)$ in which R1 and R2 represent saturated alkyl groups with a total of 6, 7 or 8 carbon atoms
(M3) is hydroxyethyl (meth)acrylate and/or hydroxypropyl (meth)acrylate
(M5) is styrene, methyl (meth)acrylate and/or n-butyl (meth)acrylate
for the one or more subsequent steps:
(M3) is hydroxyethyl (meth)acrylate and/or hydroxypropyl (meth)acrylate
(M4) is (meth)acrylic acid
(M5) is styrene, methyl (meth)acrylate and/or n-butyl (meth)acrylate.

The vinyl monomers $H_2C=CH-O-C(=O)-C(R1)(R2)(CH_3)$ in which R1 and R2 represent saturated alkyl groups with a total of 6, 7 or 8 carbon atoms are available commercially as VeoVa® Monomer 9, 10 and 11 (Hexion Specialty Chemicals B.V., Rotterdam, NL), with VeoVa® Monomer 9 being particularly preferred. The stated monomers differ in terms of the glass transition temperature of their homopolymers: VeoVa® 9 (+70° C.), VeoVa® 10 (−3° C.), VeoVa® 11 (−40° C.), Preferably the monomers (M1) to (M5) are here used in the following amounts:
for the synthesis of copolymer (P1):
(M1) ≥10 weight-% to ≤30 weight-% (preferably ≥15 weight-% to ≤25 weight-%)
(M2) ≥5 weight-% to ≤25 weight-% (preferably ≥10 weight-% to ≤20 weight-%)
(M3) ≥10 weight-% to ≤30 weight-% (preferably ≥15 weight-% to ≤25 weight-%)
(M5) ≥30 weight-% to ≤60 weight-% (preferably ≥40 weight-% to ≤50 weight-%)
based on the total weight of the solids in (P1), the amounts given adding up to ≤100 weight-%
for the one or more subsequent steps:
(M3) ≥10 weight-% to ≤30 weight-% (preferably ≥15 weight-% to ≤25 weight-%)
(M4) ≥1 weight-% to ≤10 weight-% (preferably ≥3 weight-% to ≤8 weight-%)
(M5) ≥40 weight-% to ≤80 weight-% (preferably ≥50 weight-% to ≤65 weight-%)
and the glycidyl esters of aliphatic carboxylic acids in amounts of ≥5 weight-% to ≤20 weight-% (preferably (preferably ≥7 weight-% to ≤15 weight-%),
based on the total weight of the solids in the dispersion, the amounts given adding up to ≤100 weight-%.

The present invention is also directed towards a method for producing a dispersion according to the invention, comprising the step of free-radically polymerizing a mixture of monomers (M) comprising:
(M1) cycloaliphatic esters of acrylic and/or methylacrylic acid
(M2) vinyl esters of aliphatic carboxylic acids
(M3) hydroxy-functional, free-radically polymerizable monomers
(M4) carboxyl-functional, free-radically polymerizable monomers (M5) hydroxyl- and carboxyl-free (meth)acrylic esters having C1 to C12 hydrocarbon radicals in the alcohol moiety and/or vinylaromatics thereby obtaining a copolymer (P), wherein the mixture further comprises glycidyl esters of aliphatic carboxylic acids.

Preferably the content of solids in the dispersion is in a range of ≥10 weight-% to ≤90 weight-%, based on the total weight of the dispersion and wherein organic solvents are present in an amount of ≤5 weight-%, based on the total weight of the dispersion.

In another embodiment of the method according to the invention the copolymer (P) is synthesized by first synthesizing a copolymer (P1) from mixture of free-radically polymerizable monomers (M) comprising:
(M1) cycloaliphatic esters of acrylic and/or methylacrylic acid
(M2) vinyl esters of aliphatic carboxylic acids
(M3) hydroxy-functional, free-radically polymerizable monomers
(M5) hydroxyl- and carboxyl-free (meth)acrylic esters having C1 to C12 hydrocarbon radicals in the alcohol moiety and/or vinylaromatics,
followed by adding to the copolymer (P1) in one or more subsequent steps a mixture of free-radically polymerizable monomers (M) comprising:
(M3) hydroxy-functional, free-radically polymerizable monomers
(M4) carboxyl-functional, free-radically polymerizable monomers
(M5) hydroxyl- and carboxyl-free (meth)acrylic esters having C1 to C12 hydrocarbon radicals in the alcohol moiety and/or vinylaromatics and comprising glycidyl esters of aliphatic carboxylic acids.

In another embodiment of the method according to the invention the monomers (M1) to (M5) are used in the following amounts:
for the synthesis of copolymer (P1):
(M1) ≥10 weight-% to ≤30 weight-% (preferably ≥15 weight-% to ≤25 weight-%)
(M2) ≥5 weight-% to ≤25 weight-% (preferably ≥10 weight-% to ≤20 weight-%)
(M3) ≥10 weight-% to ≤30 weight-% (preferably ≥15 weight-% to ≤25 weight-%)
(M5) ≥30 weight-% to ≤60 weight-% (preferably ≥40 weight-% to ≤50 weight-%) based on the total weight of the solids in (P1), the amounts given adding up to ≤100 weight-%
for the one or more subsequent steps:
(M3) ≥10 weight-% to ≤30 weight-% (preferably ≥15 weight-% to ≤25 weight-%)
(M4) ≥1 weight-% to ≤10 weight-% (preferably ≥3 weight-% to ≤8 weight-%)
(M5) ≥40 weight-% to ≤80 weight-% (preferably ≥50 weight-% to ≤65 weight-%)
and the glycidyl esters of aliphatic carboxylic acids in amounts of ≥5 weight-% to ≤20 weight-% (preferably (preferably ≥7 weight-% to ≤15 weight-%),
based on the total weight of the solids in the dispersion, the amounts given adding up to ≤100 weight-%.

Another aspect of the invention is the use of a dispersion according to the invention as a coating material.

The invention is further concerned with the use of a dispersion according to the invention as a binder for aqueous two-component polyurethane coatings in combination with crosslinkers (X). Crosslinkers (X) used are preferably polyisocyanates. Such polyisocyanates have two or more NCO groups per molecule and are based for example on isophorone diisocyanate, hexamethylene diisocyanate, 1,4-diisocyanatocyclohexane, bis(4-isocyanatocyclohexane)methane, 1,3-diisocyanatobenzene, triisocyanatononane or the isomeric 2,4- and 2,6-TDI, and may further contain urethane, isocyanurate and/or biuret groups. Optionally the polyisocyanates may also be blocked.

Particular preference is given to the use of low-viscosity polyisocyanates of the above-mentioned kind, based on aliphatic or cycloaliphatic isocyanates. Optionally these may also be hydrophilicized.

The polyisocyanates used as crosslinkers generally have a viscosity at 23° C. of 10 to 5000 mPas and may also be employed, if desired in order to adjust viscosity, in a blend with small amounts of inert solvents.

The copolymers of the invention are generally hydrophilic enough that even hydrophobic crosslinker resins can be dispersed without additional emulsifiers. However, this is not to rule out the use of external emulsifiers.

Water-soluble or dispersible polyisocyanates are obtainable for example by modification of carboxylate, sulphonate and/or polyethylene oxide groups and/or polyethylene oxide/polypropylene oxide groups. The polyisocyanates can be made hydrophilic by means for example of reaction with substoichiometric amounts of monohydric, hydrophilic polyether alcohols. The preparation of hydrophilicized polyisocyanates of this kind is described for example in EP-A 0 540 985 (p. 3, 1.55 to p. 4, 1.5). Also highly suitable are the polyisocyanates containing allophanate groups that are described in EP-A 959 087 (p. 3, 1.39 to 51), which are prepared by reacting low-monomer-content polyisocyanates with polyethylene oxide polyether alcohols under allophanatization conditions. Also suitable are the water-dispersible polyisocyanate mixtures described in DE-A 100 078 21 (p. 2, 1.66 to p. 31.5), which are based on triisocyanatononane. Of particular suitability and preference are polyisocyanates hydrophilicized with ionic groups, especially sulphonate groups, of the kind described in DE-A 100 24 624 (P. 3 11.13 to 33), for example.

Also possible in principle, of course, is the use of mixtures of different crosslinker resins.

The ratio of the hydroxyl groups of the binder component to the isocyanate groups of the crosslinker (X) is typically 3:1 to 1:5, preferably 2:1 to 1:3 and with particular preference 1:1 to 1:2.

Another aspect of the invention is an aqueous two-component polyurethane coating material comprising a dispersion according to the invention and isocyanate-group containing crosslinkers (X).

Preferably the crosslinkers (X) comprise 1,6-hexamethylene diisocyanate and/or diphenylmethane diisocyanate and/or oligomers or reaction products of hexamethylene diisocyanate and/or diphenylmethane.

The coating materials comprising the aqueous secondary dispersions of the invention can be applied to any desired substrates, examples being wood, metal, plastic, paper, leather, textiles, felt, glass or mineral substrates, and also the substrates which have already been coated. One particularly preferred application is the use of the aqueous coating materials for producing coatings on absorbent substrates such as wood or open-pored, mineral substrates, for example. A preferred substrate is wood.

Likewise provided for the present invention are articles of wood, coated with coating materials comprising the aqueous secondary dispersions of the invention.

The coating materials can be used as they are or in combination with further auxiliaries and adjuvants known from coating technology, such as fillers and pigments, for example.

The coating materials comprising the secondary dispersions of the invention can be applied in known ways, such as by spreading, pouring, knife coating, injecting, spraying, spin coating, rolling or dipping, for example.

The present invention will be described by the following examples without wishing to be limited by them.

GLOSSARY

Dowanol® PnB: Propylene glycol n-butyl ether

Peroxan® DB: Di-tert.-butylperoxide

MMA: Methyl methacrylate

HEMA: Hydroxyethyl methacrylate

Veova® 9: $H_2C=CH-O-C(=O)-C(R1)(R2)(CH_3)$ in which R1 and R2 represent saturated alkyl groups with a total of 6 carbon atoms Cardura® E10: Glycidyl ester of neodecanoic acid DMEA: N,N-Dimethylethanolamine Surfynol® 104 BC Nonionic surfactant Disperbyk® 191 98% VOC-free and solvent-free wetting and dispersing additive BYK® 028 98% VOC-free silicone defoamer Borchigel® PW 25 Thickener Resiflow® W 52 50% Flow control agent BYK® 378 Silicone surface additive Byk® 349 Silicone surfactant Tronox® RKB4 Titanium dioxide pigment Schwegofoam® 8333 VOC-free defoamer Desmodur® 3900 Low-viscosity, aliphatic polyisocyanate resin based HDI Butoxyl® 3-Methoxy-n-butyl acetate Properties determined were the solids content (thick-film method: lid, 1 g of sample, 1 h at 125° C., convection oven, specified in DIN EN ISO 3251); the acid number (mg KOH/g sample, titration with 0.1 mol/l NaOH solution, specified in DIN 53402); the OH number (mg KOH/g sample, acetylation, hydrolysis, titration with 0.1 mol/l NaOH, specified in DIN 53240).

MEK Wiping Test

A cotton wad soaked with methyl ethyl ketone (MEK) was moved back and forth over the coating film 100 times with a constant pressure (100 double rubs). If severe damage or delamination was observed even after less than 100 double rubs, the test was discontinued. After the test the sheets were assessed visually for clouding and/or film delamination.

The pendulum hardness is determined according to DIN 53157.

The Buchholz hardness is determined according to DIN 53153.

The Erichsen test is carried out according to DIN 53156.

The pencil hardness is determined according to DIN EN ISO 13523-4.

EXAMPLE 1

Precursor

A polyacrylate precursor was prepared using the following components:

|  | Component | Amount [g] |
| --- | --- | --- |
| Part 1 | Dowanol® PnB | 3438 |
| Part 2 | Peroxan® DB | 33 |
|  | Dowanol® PnB | 33 |
| Part 3 | Styrene | 570 |
|  | HEMA | 1601 |
|  | n-Butyl acrylate | 341 |
|  | n-Butyl methacrylate | 4294 |
|  | Veova® 9 | 1251 |
| Part 4 | Peroxan® DB | 118 |
|  | Dowanol® PnB | 321 |

Part 1 was charged to a 10 L reactor with stirrer, reflux condenser, temperature measurement and monomer feed apparatus (dropping funnel) and blanketed with a gentle stream of nitrogen for 1 hour. The batch was then heated to 148° C. with stirring. After the temperature had been reached, part 2 was added over the course of 20 minutes. Immediately thereafter, in parallel, parts 3 and 4 were metered in over 4.5 hours optionally with cooling so that the temperature did not exceed 153° C. Following complete addition, the batch was held at 148° C. for 1 hour. Cooling gave a high-viscosity resin with 68.5±1% by weight solids content.

EXAMPLE 2

Copolymer Dispersion

A polyacrylate copolymer dispersion was prepared using the following components:

|  | Component | Amount [g] |
| --- | --- | --- |
| Part 1 | Cardura® E10 | 1052 |
|  | Precursor of example 1 (68.4 weight-% solids) | 911 |
| Part 2 | Peroxan® DB | 37 |
| Part 3 | MMA | 3269 |
|  | n-Butyl acrylate | 3319 |
|  | Acrylic acid | 332 |
| Part 4 | Peroxan® DB | 108 |
|  | Dowanol® PnB | 80 |
| Part 5 | MMA | 388 |
|  | HEMA | 529 |
|  | n-Butyl acrylate | 161 |
|  | Acrylic acid | 176 |
| Part 6 | Peroxan® DB | 17 |
|  | Dowanol® PnB | 80 |
| Part 7 | DMEA | 209 |
| Part 8 | Deionized water | 6231 |

Part 1 was charged to a 30 L reactor with stirrer, reflux condenser, temperature measurement and monomer feed apparatus (dropping funnel) and blanketed with a gentle stream of nitrogen for 1 hour. The batch was then heated to 148° C. with stirring. After the temperature had been reached, part 2 was added over the course of 20 minutes. Immediately thereafter, in parallel, parts 3 and 4 were metered in over 4.5 hours, optionally with cooling. Following complete addition, the batch was held at 148° C. for 0.5 hours. Subsequently parts 5 and 6 were metered in over 1.5 hours. Subsequently the batch was held at 148° C. for an hour, then cooled to 120° C. The pressure was lowered to below 2.5 bar and a sample of 5000 g was taken. Under cooling to 95° C. part 7 was added and the mixture was stirred for 30 minutes. Finally, part 8 was added over the course of 30 minutes to carry out dispersion, followed by stirring at 80° C. for 2 hours and discharge through filters.

EXAMPLE 3

Copolymer Dispersion

A polyacrylate copolymer dispersion was prepared using the following components:

|  | Component | Amount [g] |
|---|---|---|
| Part 1 | Cardura® E10 | 1052 |
|  | Precursor of example 1 (68.4 weight-% solids) | 911 |
| Part 2 | Peroxan® DB | 47 |
| Part 3 | Styrene | 476 |
|  | HEMA | 4371 |
|  | n-Butyl acrylate | 1843 |
|  | Acrylic acid | 302 |
| Part 4 | Peroxan® DB | 138 |
|  | Dowanol® PnB | 80 |
| Part 5 | MMA | 488 |
|  | HEMA | 929 |
|  | n-Butyl acrylate | 561 |
|  | Acrylic acid | 176 |
| Part 6 | Peroxan® DB | 27 |
|  | Dowanol® PnB | 80 |
| Part 7 | DMEA | 209 |
| Part 8 | Deionized water | 6231 |

Part 1 was charged to a 30 L reactor with stirrer, reflux condenser, temperature measurement and monomer feed apparatus (dropping funnel) and blanketed with a gentle stream of nitrogen for 1 hour. The batch was then heated to 148° C. with stirring. After the temperature had been reached, part 2 was added over the course of 20 minutes. Immediately thereafter, in parallel, parts 3 and 4 were metered in over 4.5 hours, optionally with cooling. Following complete addition, the batch was held at 148° C. for 0.5 hours. Subsequently parts 5 and 6 were metered in over 1.5 hours. Subsequently the batch was held at 148° C. for an hour, then cooled to 120° C. The pressure was lowered to below 2.5 bar and a sample of 5000 g was taken. Under cooling to 95° C. part 7 was added and the mixture was stirred for 30 minutes. Finally, part 8 was added over the course of 30 minutes to carry out dispersion, followed by stirring at 80° C. for 2 hours and discharge through filters.

EXAMPLE 4

Application Testing

Coating formulations were prepared using the following components, the amounts given being weight parts:

| Component | Comp. | Ex. 4-1 | Ex. 4-2 |
|---|---|---|---|
| Bayhydrol® A 145 | 40.29 |  |  |
| Dispersion of example 2 (47.6 wt.-% solids, 3.3 wt.-%, 2 wt.-%) |  | 54.53 |  |
| Dispersion of example 3 (48 wt.-% solids, 3.3 wt.-%, 2 wt.-%) |  |  | 38.41 |
| Surfynol® 104 BC | 0.64 | 0.86 | 0.61 |
| Disperbyk® 191 98% | 1.03 | 1.46 | 1.04 |
| BYK® 028 98% | 0.18 | 0.25 | 0.18 |
| Borchigel® PW 25 | 0.16 | 0.22 | 0.16 |
| Resiflow® W 52 50% | 0.49 | 0.66 | 0.47 |
| Tronox® RKB4 | 18.73 | 18.61 | 19.06 |
| Schwegofoam® 8333 | 0.70 | 0.94 | 0.66 |
| Water | 5.11 | 6.86 | 7.25 |
| Total | 67.33 | 84.39 | 67.84 |
| Bayhydrol® A 145 | 17.14 |  |  |
| Dispersion of example 2 (47.6 wt.-% solids, 3.3 wt.-%, 2 wt.-%) |  |  |  |
| Dispersion of example 3 (48 wt.-% solids, 3.3 wt.-%, 2 wt.-%) |  |  | 16.35 |
| Total | 84.47 | 84.39 | 84.19 |
| Desmodur® N 3900 75% Butoxyl® | 15.53 | 15.61 | 15.81 |
| Total coating | 100.00 | 100.00 | 100.00 |
| Water for spraying viscosity | 11.5 | 10.6 | 11.1 |
| Flow time [s]: | 29 | 31 | 30 |
| OH:NCO | 1:1.3 | 1:1.3 | 1:1.3 |
| Solids [wt.-%] | 52.66 | 54 | 53.74 |
| Solvent [wt.-%] | 8.18 | 5.23 | 5.1 |
| VOC: | 186 | 122 | 121 |
| Ratio dispersion solids:pigments | 1:0.725 | 1:0.72 | 1:.72 |
| Drying time T1/T2/T3/T4 | 1/7.5/x | 1/8/x | 1/8/x |
| Pot life [s]    0 h | 30 | 28 | 31 |
| 1 h | 35 | 29 | 34 |
| 2 h |  |  |  |
| 3 h | 49 | 52 | 67 |
| 4 h |  |  |  |
| 5 h | 71 | gr. 120 | 71 |
| 6 h |  |  |  |
| Gloss 20°/60°/Haze    0 h |  |  |  |
| 1 h | 79/87/29 | 79/88/32 | 82/89/23 |
| 2 h |  |  |  |
| 3 h | 78/87/30 | 78/87/29 | 80/8/25 |
| 4 h |  |  |  |
| 5 h | 77/88/37 | 58/82/184 | 81/90/21 |
| 6 h |  |  |  |

The test results for the coatings are summarized in the following table. RT=drying at room temperature, 30' 60° C.=drying by storage at 60° C. for 30 minutes.

|  | Comp. RT | Comp. 30'60° C. | Ex. 9-1 RT | Ex. 9-1 30'60° C. | Ex. 9-2 RT | Ex. 9-2 30'60° C. |
|---|---|---|---|---|---|---|
| Pendulum hardness |  |  |  |  |  |  |
| film thickness [μm] |  |  |  |  |  |  |
| 1 d | 81 | 119 | 43 | 81 | 69 | 126 |
| 7 d | 91 | 137 | 58 | 96 | 86 | 147 |
| Gloss 20°/60°/Haze |  |  |  |  |  |  |
| Buchholz hardness |  |  |  |  |  |  |
| film thickness [μm] |  |  |  |  |  |  |

-continued

|  | Comp. RT | Comp. 30'60° C. | Ex. 9-1 RT | Ex. 9-1 30'60° C. | Ex. 9-2 RT | Ex. 9-2 30'60° C. |
|---|---|---|---|---|---|---|
| Impression resistance | | | | | | |
| 1 d | 66.7 | 83.3 | 62.5 | 76.9 | 62.5 | 76.9 |
| 7 d | 66.7 | 100 | 66.7 | 83.3 | 62.5 | 90.9 |
| Erichsen test Steel film thickness [μm] | | | | | | |
| 1 d | 8.5 | 9.0 | 9.0 | 8.5 | 9.5 | 8.0 |
| 7 d | 9.0 | 9.0 | 9.0 | 8.5 | 9.0 | 9.0 |
| Pencil hardness film thickness [μm] | | | | | | |
| 1 d | 2B | HB | 2B | HB | 2B | HB |
| 7 d | HB | H | B-HB | HB | HB | F |
| MEK wiping test | | | | | | |
| 1 d | OK | OK | OK | OK | OK | OK |
| 7 d | OK | OK | OK | OK | OK | OK |
| Thorn bending conical | | | | | | |
| 7 d | 0 | 0 | 0 | 0 | 0 | 0 |
| Water drop water resistance film thickness [μm] | | | | | | |
| 16 h | m5/g1-2 | m5/g1 | m5/g1 | m4/g1 | m5/g1-2 | m2/g1 |
| 32 h | | | | m5/g1 | | m5/g1 |
| 40 h | | | | | | |
| Water resistance SD | | | | | | |
| 0 d | 81/89/18 | 81/87/18 | 80/88/32 | 79/87/28 | 83/90/18 | 82/90/24 |
| 1 d | 80/88 | 79/87 | 79/80 | 80/89 | 82/69 | 81/89 |
| 2 d | 77/86 | 81/89 | 79/88 | 80/88 | 82/89 | 81/88 |
| 3 d | | | | | | |
| 4 d | | | | | | |
| 5 d | 76/83 | 79/87 | 78/81 | 78/86 | 82/89 | 79/87 |
| 6 d | 78/86 | 80/88 | 80/89 | 78/86 | 82/89 | 79/87 |
| 7 d | | | | | | |
| 8 d | 72/85 | 75/84 | 77/88 | 77/87 | 81/88 | 80/87 |
| 9 d | | | | | | |
| 10 d | | | | | | |
| 11 d | | | | | | |
| 12 d | 74/83 | 77/86 | 77/87 | 80/88 | 78/88 | 80/88 |
| 13 d | | | | | | |
| 14 d | 77/85 | 78/87 | 77/86 | 79/8 | 82/89 | 81/84 |

The invention claimed is:

1. An aqueous secondary copolymer dispersion comprising a copolymer (P) synthesized from a mixture of free-radically polymerizable monomers (M) comprising:
   (M1) ≥0.1 weight-% to ≤3 weight-% of a cycloaliphatic ester of acrylic and/or methylacrylic acid,
   (M2) ≥0.1 weight-% to ≤3 weight-% of a vinyl ester of aliphatic carboxylic acid,
   (M3) ≥10 weight-% to ≤30 weight-%, of a hydroxy-functional, free-radically polymerizable monomer,
   (M4) ≥1 weight-% to ≤10 weight-% of a carboxyl-functional, free-radically polymerizable monomer, and
   (M5) ≥40 weight-% to ≤80 weight-% of a hydroxyl- and carboxyl-free (meth)acrylic ester having C1 to C12 hydrocarbon radicals in the alcohol moiety and/or vinyl aromatic monomer,
   wherein the mixture further comprises a glycidyl ester of an aliphatic carboxylic acid in an amount of ≥5 weight-% to ≤20 weight-%,
   based on the total weight of the solids in the dispersion, the amounts given adding up to ≤100 weight-%.

2. The dispersion according to claim 1, wherein the content of solids in the dispersion is in a range of ≥10 weight-% to ≤90 weight-%, based on the total weight of the dispersion and wherein organic solvents are present in an amount of ≤5 weight-%, based on the total weight of the dispersion.

3. The dispersion according to claim 1, wherein in the glycidyl ester of aliphatic carboxylic acid the carboxylic acid comprises 8, 9 and/or 10 carbon atoms.

4. The dispersion according to claim 1, wherein:
   (M1) is isobornyl (meth)acrylate,
   (M2) is represented by the formula $H_2C=CH-O-C(=O)-C(R1)(R2)(CH_3)$ in which R1 and R2 represent saturated alkyl groups with a total of 6, 7 or 8 carbon atoms,
   (M3) is hydroxyethyl (meth)acrylate and/or hydroxypropyl (meth)acrylate,
   (M4) is (meth)acrylic acid, and
   (M5) is styrene, methyl (meth)acrylate and/or n-butyl (meth)acrylate.

5. A method for producing a dispersion according to claim 1, comprising the step of free-radically polymerizing a mixture of monomers (M) comprising:
   (M1) ≥0.1 weight-% to ≤3 weight-% of a cycloaliphatic ester of acrylic and/or methylacrylic acid, (M2) ≥0.1 weight-% to ≤3 weight-% of a vinyl esters of aliphatic carboxylic acid, (M3) ≥10 weight-% to ≤30 weight-%, of a hydroxy-functional, free-radically polymerizable monomer, (M4) ≥1 weight-% to ≤10 weight-% of a carboxyl-functional, free-radically polymerizable monomer, (M5) ≥40 weight-% to ≤80 weight-% of a hydroxyl- and carboxyl-free (meth)acrylic ester having C1 to C12 hydrocarbon radicals in the alcohol moiety and/or vinyl aromatic monomer, wherein the mixture further comprises a glycidyl esters of an aliphatic carboxylic acid in an amount of ≥5 weight-% to ≤20 weight-%, thereby obtaining a copolymer (P), said amounts based on the total weight of the solids in the dispersion, the amounts given adding up to ≤100 weight-%.

6. A method comprising utilizing the dispersion according to claim 1 as a coating material.

* * * * *